United States Patent Office 3,259,610
Patented July 5, 1966

3,259,610
POLYMERIZATION PROCESS AND CATALYST THEREFOR
George N. Grammer and Edwin D. Hornbaker, Baton Rouge, La., assignors to Ethyl Corporation, New York, N.Y., a corporation of Virginia
No Drawing. Filed Feb. 12, 1962, Ser. No. 172,803
15 Claims. (Cl. 260—85.5)

This invention relates to the polymerization of vinylidene chloride, either alone or together with monomers copolymerizable therewith, and to novel catalyst systems which are well suited for the production of high quality polymers of this type.

The successful utilization of the Ziegler catalyst systems (e.g. British Patents 799,392; 799,823; and 801,031) in the preparation of polyolefin polymers is well known. The advantages of this relatively new technology in the production of polyethylene, polypropylene, copolymers of ethylene and propylene and the like are likewise well known.

Unfortunately, however, the Ziegler catalyst systems are not well adapted for the polymerization of vinylidene chloride (1,1-dichloroethylene or for the formation of copolymers thereof. Attempts to utilize the Ziegler systems for effecting such polymerizations result largely in dehydrochlorination of the polymers during their formation. The consequences of such dehydrochlorination are particularly undesirable because this phenomenon is manifested not only in loss of desirable polymer properties but in the distinct discoloration thereof. Frequently polyvinylidene chloride formed by use of a conventional Ziegler catalyst will exhibit colors ranging from tan to brown.

There is, therefore, a distinct need in the art for a process in by which Ziegler type catalysts may be effectively utilized in the polymerization of vinylidene chloride, either alone or together with monomers copolymerizable therewith, in which the foregoing deficiencies are overcome or at least sharply reduced in severity.

An object of this invention is to fulfill the foregoing need. Another object is to provide a novel process and novel catalytic systems which are substantially free of the difficulties and shortcomings referred to above. A further object is to provide a novel process for the polymerization of vinylidene chloride either alone or together with monomers copolymerizable therewith. Still another object is to provide novel catalysts which are especially adapted for effecting such polymerizations but which may have important utilities in other areas of polymerization technology. Other important objects of this invention will be apparent from the ensuing description.

According to this invention vinylidene chloride is polymerized by contacting the same under polymerization conditions with a novel catalyst system. This catalyst initially consists essentially of (1) An alkyl aluminum compound of the formula $R_xAlH_y$ wherein R is an alkyl group of up to about 8 carbon atoms, $x$ is an integer from 2 to 3, and $y$ is an integer from 0 to 1, $x+y$ being equal to 3;

(2) A molybdenum trihalide; and (3) A material (hereinafter sometimes called a modifier) selected from the group consisting of (a) Dialkylethers containing up to about 12 carbon atoms in the molecule, (b) Alkyl acetates in which the alkyl group contains up to about 6 carbon atoms, (c) Trialkyl amines containing 3 to about 24 carbon atoms in the molecule, (d) Pyridine (i.e. pyridine or ring alkylated derivatives thereof), (e) Dioxane (i.e. 1,3-dioxane, 1,4-dioxane or ring alkylated derivatives thereof), (f) Tetrahydrofuran (i.e. tetrahydrofuran or ring alkylated derivatives thereof).

Of these modifiers the dioxanes, especially 1,4-dioxane, and unsubstituted tetrahydrofuran are preferred because their use results in generally higher conversions of the vinylidene chloride into the desired polymer.

It has been found that these 3-component catalyst systems very effectively polymerize vinylidene chloride into high molecular weight polymers possessing excellent physical properties. Especially noteworthy is the fact that these catalytic systems essentially eliminate the occurrence of the undesirable dehydrochlorination reactions which normaly subsists when attempting to utilize conventional Ziegler catalysts in effecting such polymerizations. A tangible manifestation of this beneficial result is the observation that each one of a series of polyvinylidene chloride polymers produced in accordance with this invention was white; no dehydrochlorination or discoloration was found to occur.

The heart of this invention resides in the particular catalyst system employed in polymerizing vinylidene chloride. In other words, the beneficial results discussed above definitely appear to be based on the selective coaction among the several ingredients used in formulating the present catalysts. For example, while vanadium tetrachloride has heretofore been suggested as a conventional Ziegler catalyst its use together with an alkyl aluminum compound and methyl acetate produced polyvinylidene chloride which had undergone an extensive amount of dehydrochlorination. In fact, the polymer was brown. However, when per this invention, molybdenum trichloride was used instead of vanadium tetrachloride in this 3-component catalysts mixture, pure white polyvinylidene chloride was produced.

The first ingredient used in making the present catalyst is the above-described alkyl aluminum compound which is exemplified by trimethyl aluminum, triethyl aluminum, tripropyl aluminum, triisobutyl aluminum, trihexyl aluminum, trioctyl aluminum, diethyl aluminum hydride, diisobutyl aluminum hydride, di-(2-hexyl) aluminum hydride, and the like. Of these, the trialkyl aluminum compounds are preferred from a cost-effectiveness standpoint. Triethyl aluminum has been found to give unusually good results and is therefore particularly preferred.

The second ingredient, the inorganic molybdenum trihalide salt, is exemplified by such compounds as molybdenum trichloride, molybdenum tribromide, and the like, although if desired, use may be made of the corresponding dihalides or oxytrihalides (e.g. molybdenum dichloride, molybdenum dibromide, molybdenum oxytrichloride, etc.). Best results are achieved by the use of molybdenum trichloride and accordingly its use as an ingredient in the present catalyst system is preferred.

The third component—viz. the modifier—is a dialkylether, an alkyl acetate, a trialkylamine, a pyridine compound, a dioxane compound or a tetrahydrofuran compound as defined above. Examples of the dialkylethers include dimethylether, diethylether, diisopropylether, dibutylether, dihexylether, methylisopentylether, and the like. Typical alkyl acetates as above defined include the methyl-, ethyl-, propyl-, isopropyl-, various butyl-, various amyl- and various hexyl acetates; methyl acetate, ethyl acetate and tert-butyl acetate being readily available at low cost and, therefore, preferred. Exemplary of the trialkylamines are such compounds as trimethylamine, triethylamine, tripropylamine, tributylamine, trihexylamine, triheptylamine, trioctylamine, diethylbutylamine, and the like. The pyridines include pyridine itself and the various ring alkyl alkylated derivatives thereof such as 2-ethyl pyridine, 3-ethyl pyridine, 4-ethyl pyridine, 2-ethyl-3,5-dimethyl pyridine, 3-ethyl-4-methyl pyridine, 2-isopropyl pyridine, 2,4,6-trimethyl pyridine, and the like. The dioxanes are exemplified by 1,3-dioxane, 5-methyl-1,3-dioxane, 1,4-dioxane, 2,5-diethyl-1,4-dioxane, and like substances. The tetrahydrofuran compounds are exemplified by the preferred material, unsubstituted tetrahydrofuran itself, as well as the alkylated derivatives which include the methyl-, ethyl-, propyl-, isopropyl-, butyl-, isobutyl-, sec-butyl-, tert-butyl-, the various amyl- and the various hexyl tetrahydrofurans as well as compounds which possess two such lower alkyl radicals in the molecule. The principles of this invention do extend and apply, however, to the employment of the higher homologs of the foregoing dialkylethers, alkyl acetates, trialkylamines, pyridine compounds, dioxane compounds and tetrahydrofuran compounds.

The ingredients are preferably used in relative amounts such that there are from about 1 to about 5 moles of the alkyl aluminum compound per mole of the inorganic molybdenum halide salt and from about 0.5 to about 3 moles of the modifier per mole of the organoaluminum compound. Significant departures from these proportions may result in a considerable drop off in conversion per unit of polymerization time. Also, the beneficial polymer properties may be impaired by significant departures from these proportions. Particularly good results were obtained when the ratios of organoaluminum compound:inorganic molybdenum halide salt:modifier were about 3:1:3, respectively. Hence these proportions are particularly preferred.

An especially convenient and useful form for these catalyst systems is as a solution in an essentially anhydrous, inert liquid hydrocarbon, notably paraffins, cycloparaffins, and aromatics, illustrative examples of which are given hereinafter.

Particularly good catalyst systems of this invention are the combinations of triethyl aluminum-molybdenum trichloride-tetrahydrofuran; and triethyl aluminum-molybdenum trichloride-1,4-dioxane, where the proportions of these are as defined above. These two catalyst systems have been found to give conversions based on vinylidene chloride in the range of 60 to 70 percent and at the same time produce white polymers.

The order of addition of the several catalyst ingredients does not appear to be particularly critical but somewhat better results have been achieved by contacting the organoaluminum compound with the modifier prior to the introduction of the molybdenum halide into the catalyst mixture. This, then, constitutes a preferred method of formulating the present catalyst systems. The available experimental evidence indicates that all modes of addition give active catalysts which do not tend to cause dehydrochlorination of the polymers at moderate polymerization temperatures, but the catalyst formed by this preferred formulation technique apparently gives somewhat higher conversions per unit time.

The process of this invention is well suited for the homopolymerization of vinylidene chloride and also the copolymerization of vinylidene chloride with monomers copolymerizable therewith, especially vinyl chloride, acrylonitrile, methyl acrylate, methyl methacrylate, vinyl formate, vinyl acetate, 4-vinyl pyridine, vinyl ethyl ether, and like vinyl-type polar monomers. This invention is particularly well adapted to the formation of vinylidene chloride polymers in which at least the major proportion (on a molar basis) of the monomer composition is vinylidene chloride. In the copolymer area the adaptation of the present process to the formation of vinylidene chloride-acylonitrile and vinylidene chloride-vinyl chloride copolymers which contain from about 70 to about 95 mole percent of the vinylidene chloride is especially preferred.

Another advantageous feature of this invention is the fact that conventional low-pressure Ziegler-type polymerization conditions can be and are effectively used in its practice; special polymerization conditions are unnecessary. For example, polymerization temperatures can range from between about 0 to about 100° C. (and preferably between about 50 and about 90° C.). The polymerization can be effected at atmospheric pressure or at relatively mild elevated pressures such as up to about 20 to 30 atmospheres. Catalyst concentrations can range from about 0.001 to about 0.05 mole (based on the inorganic molybdenum halide salt contained in the catalyst mixture) per mole of monomer being polymerized or copolymerized.

As a rule it is advisable to polymerize the vinylidene chloride in the liquid phase. Thus when utilizing temperatures below about 30° C. no special solvent is required, but it can be used if desired. On the other hand, when conducting the present process under higher temperature conditions it is desirable to employ a conventional inert diluent in order to achieve a liquid phase reaction. For this use good results are achieved from liquid paraffinic hydrocarbons (e.g. hexanes, heptanes, octanes, etc.), cycloparaffins (cyclopentanes, cyclohexanes and lower alkylated derivatives thereof), aromatic hydrocarbons (e.g. benzene, toluene, xylenes, etc.), or mixtures of such materials (e.g. petroleum naphthas, petroleum ethers and the like).

Conventional work-up procedures can also be used to recover and purify the polymers produced by the present process. For example, upon completion of the polymerization reaction (on a batch basis polymerization times ranging from about 1 or 2 hours up to about 24 hours or so can be used) the catalyst is generally decomposed by addition to the reaction system of an alcohol such as methanol. The polymer can then be separated from the system (e.g. by filtration, centrifugation, etc.) and thereupon be washed and purified by means of such solvents as methanolic HCl, water, acetone, heptane and/or ether. Conventional drying procedures are also applicable.

The practice and advantages of this invention will be still further apparent from the following illustrative examples which are to be considered as exemplary of this invention and not limitive thereof.

EXAMPLE I

A series of polymerization reactions was carried out in stainless steel pipe bombs each having a capacity of approximately 200 milliliters. The addition of solvents and catalyst components was conducted in an essentially anhydrous nitrogen atmosphere. In each instance the reaction diluent, n-heptane, was first introduced into the bombs followed by triethyl aluminum. Thereupon in all runs except Run 7 a modifier was introduced into the system followed by either molybdenum trichloride or vanadium tetrachloride. In Run 7 the molybdenum trichloride was charged before the modifier. Then, after charging vinylidene chloride into the bombs to a concentration of 5 moles per liter of heptane solvent, the bombs were sealed and rotated for 18 hours in baths maintained at either 60 or 65° C. The catalyst was then destroyed by the addition of methyl alcohol and the polyvinylidene chloride polymer was treated with methyl alcohol and hydrochloric acid and then isolated from the liquids by filtration. After further treatment with methyl alcohol in a rotary blade blending apparatus, the polymer was dried at 50° C. The results of these polymerization runs are summarized in the table.

Table.—*Polymerization of vinylidene chloride—effect of catalyst composition on polymer properties*

| Run No. | Catalyst Systems[a] | Polymerization Temp., °C. | Appearance of Polymer |
|---|---|---|---|
| 1 | Triethyl aluminum-molybdenum trichloride-1,4-dioxane. | 60 | White. |
| 2 | Triethyl aluminum-molybdenum trichloride-diethylether. | 60 | Do. |
| 3 | Triethyl aluminum-molybdenum trichloride-tetrahydrofuran. | 60 | Do. |
| 4 | Triethyl aluminum-molybdenum trichloride-methyl acetate. | 60 | Do. |
| 5 | Triethyl aluminum-molybdenum trichloride-triethylamine. | 60 | Do. |
| 6 | Triethyl aluminum-molybdenum trichloride-pyridine. | 60 | Do. |
| 7 | Triethyl aluminum-molybdenum trichloride-1,4-dioxane[b]. | 65 | Do. |
| 8 | Triethyl aluminum-vanadium tetrachloride-methylacetate. | 65 | Brown. |

[a] In each instance the triethyl aluminum:transition metal salt molar ratio was 3:1, the modifier:triethyl aluminum molar ratio was 1:1, and the vinylidene chloride:transition metal salt ratio was 80:1.
[b] The molybdenum trichloride was added to the triethyl aluminum followed by the addition of the 1,4-dioxane.

It will be noted by comparing Runs 1–7, inclusive, with Run 8 that the catalyst combinations of this invention eliminated or essentially eliminated dehydrochlorination, whereas the use of a modified Ziegler system suggested heretofore resulted in the formation of a badly discolored polymer which had undergone considerable dehydrochlorination.

EXAMPLE II

A series of 3 runs was conducted using the general procedure of Example I utilizing the triethyl aluminum-molybdenum trichloride-1,4-dioxane catalyst system at a polymerization temperature of 60° C. In the present runs the order of addition of the 3 components to the reaction system was varied in 3 ways. It was found that after 18 hours the conversion of the vinylidene chloride into polyvinylidene chloride was highest when the catalyst was formulated in the order of triethyl aluminum, 1,4-dioxane, molybdenum trichloride; intermediate when formulated in the order of molybdenum trichloride, 1,4-dioxane, triethyl aluminum; and lowest when formulated in the order of triethyl aluminum, molybdenum trichloride, 1,4-dioxane. In all cases, however, the resultant polymer showed no signs of dehydrochlorination. The polymer was white.

EXAMPLE III

The procedure of Example I, Runs 1–7, is repeated except that the monomer charge is composed of 80 mole percent of vinylidene chloride and 20 mole percent of acrylonitrile. Generally similar results are achieved.

EXAMPLE IV

The procedure of Runs 1–7 of Example I is repeated utilizing as the monomer charge vinylidene chloride and vinyl chloride in a mole ratio of 85:15 respectively. The same general results are accomplished.

Repetition of the foregoing examples utilizing other catalyst systems of this invention in the manner described herein gives rise to generally similar results.

What is claimed is:

1. A process for the polymerization of vinylidene chloride which comprises contacting said monomer under polymerization conditions with a catalyst system initially consisting essentially of
  (1) an alkyl aluminum compound of the formula $R_xAlH_y$ wherein R is an alkyl group of up to about 8 carbon atoms, $x$ is an integer from 2 to 3, and $y$ is an integer from 0 to 1, $x+y$ being equal to 3;
  (2) an inorganic molybdenum trihalide; and
  (3) a material selected from the group consisting of
    (a) dialkylethers containing up to about 12 carbon atoms in the molecule,
    (b) alkyl acetates in which the alkyl group contains up to about 6 carbon atoms,
    (c) trialkyl amines containing 3 to about 24 carbon atoms in the molecule,
    (d) pyridine, and
    (e) dioxane;
the relative amounts of the catalyst ingredients being such that there are from about 1 to about 5 moles of (1) per mole of (2), and from about 0.5 to about 3 moles of (3) per mole of (1).

2. The process of claim 1 wherein said alkyl aluminum compound is a trialkyl aluminum compound.

3. The process of claim 1 wherein said alkyl aluminum compound is triethyl aluminum.

4. The process of claim 1 wherein said trihalide is molybdenum trichloride.

5. The process of claim 1 wherein said material is 1,4-dioxane.

6. The process of claim 1 wherein the molar proportions of said alkyl aluminum compound:said trihalide: said material are about 3:1:3, respectively.

7. The process of claim 1 wherein said alkyl aluminum compound is triethyl aluminum, said trihalide is molybdenum trichloride, and said material is 1,4-dioxane, the mole proportions of these substances being about 3:1:3, respectively.

8. A catalyst system adapted for the polymerization of vinylidene chloride, which system initially consists essentially of
  (1) an alkyl aluminum compound of the formula $R_xAlH_y$ wherein R is an alkyl group of up to about 8 carbon atoms, $x$ is an integer from 2 to 3, and $y$ is an integer from 0 to 1, $x+y$ being equal to 3;
  (2) an inorganic molybdenum trihalide; and
  (3) a material selected from the group consisting of
    (a) dialkylethers containing up to about 12 carbon atoms in the molecule,
    (b) alkyl acetates in which the alkyl group contains up to about 6 carbon atoms,
    (c) trialkyl amines containing 3 to about 24 carbon atoms in the molecule,
    (d) pyridine, and
    (e) dioxane;
the relative amounts of the catalyst ingredients being such that there are from about 1 to about 5 moles of (1) per mole of (2), and from about 0.5 to about 3 moles of (3) per mole of (1).

9. The composition of claim 8 further characterized in that it is dissolved in a relatively inert, substantially anhydrous liquid hydrocarbon selected from the group consisting of paraffinic hydrocarbons, cycloparaffinic hydrocarbons, and aromatic hydrocarbons.

10. The composition of claim 8 wherein the molar proportions of said alkyl aluminum compound:said trihalide:said material is about 3:1:3, respectively.

11. The composition of claim 8 wherein said alkyl aluminum compound is triethyl aluminum, said trihalide is molybdenum trichloride, and said material is 1,4-dioxane, the mole proportions of these substances being about 3:1:3, respectively.

12. The process of claim 1 wherein the polymerization is conducted at a temperature in the range of from about 50 to about 90° C.

13. A process for the polymerization of vinylidene chloride which comprises contacting said monomer under polymerization conditions and at a temperature in the range of from about 0 to about 100° C. with a catalyst system initially consisting essentially of
  (1) an alkyl aluminum compound of the formula $R_xAlH_y$ wherein R is an alkyl group of up to about 8 carbon atoms, $x$ is an integer from 2 to 3, and $y$ is an integer from 0 to 1, $x+y$ being equal to 3;
  (2) molybdenum trichloride; and (3) 1,4-dioxane;
the relative amounts of the catalyst ingredients being such that there are from about 1 to about 5 moles of (1) per mole of (2), and from about 0.5 to about 3 moles of (3) per mole of (1).

14. The process of claim 13 wherein said alkyl aluminum compound is a trialkyl aluminum compound and wherein said temperature is in the range of from about 60 to about 65° C.

15. The process of claim 13 wherein said alkyl aluminum compound is triethyl aluminum and wherein said temperature is in the range of from about 60 to about 65° C.

References Cited by the Examiner

UNITED STATES PATENTS

| | | | |
|---|---|---|---|
| 2,882,264 | 4/1959 | Barnes et al. | 260—94.9 |
| 2,932,633 | 4/1960 | Juveland et al. | 260—94.9 |
| 3,067,183 | 12/1962 | Hagemeyer et al. | 260—92.8 |
| 3,089,866 | 5/1963 | Crawford | 260—87.7 |

FOREIGN PATENTS 809,717   3/1959   Great Britain.

OTHER REFERENCES

Gaylord: Linear and Stereoregular Addition Polymers (page 94 relied on), Interscience, N.Y. (1959).

Moeller: Inorganic Chemistry (page 871 relied on) Wiley, N.Y. (1954).

JOSEPH L. SCHOFER, *Primary Examiner.*

JOSEPH R. LIBERMAN, *Examiner.*

J. F. McNALLY, *Assistant Examiner.*